(12) United States Patent
Hirawake et al.

(10) Patent No.: US 11,921,043 B2
(45) Date of Patent: Mar. 5, 2024

(54) FLUORESCENCE OBSERVATION DEVICE

(71) Applicant: HAMAMATSU PHOTONICS K.K., Hamamatsu (JP)

(72) Inventors: Kazumasa Hirawake, Hamamatsu (JP); Takahiro Murakoshi, Hamamatsu (JP); Takahiro Shikayama, Hamamatsu (JP); Takayuki Sato, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 119 days.

(21) Appl. No.: 17/441,402

(22) PCT Filed: Dec. 2, 2019

(86) PCT No.: PCT/JP2019/047041
§ 371 (c)(1),
(2) Date: Sep. 21, 2021

(87) PCT Pub. No.: WO2020/194881
PCT Pub. Date: Oct. 1, 2020

(65) Prior Publication Data
US 2022/0170858 A1     Jun. 2, 2022

(30) Foreign Application Priority Data
Mar. 28, 2019 (JP) ................. 2019-062745

(51) Int. Cl.
*G01N 21/64*     (2006.01)
(52) U.S. Cl.
CPC ............... *G01N 21/6456* (2013.01)

(58) Field of Classification Search
CPC ............... G01N 21/6456; G01N 1/286; G01N 21/6452; G01N 2001/2873;
(Continued)

(56) References Cited

U.S. PATENT DOCUMENTS

| 5,609,827 A | 5/1997 | Russell et al. |
| 7,194,118 B1 | 3/2007 | Harris et al. |

(Continued)

FOREIGN PATENT DOCUMENTS

| CN | 104583754 A | 4/2015 |
| EP | 2315027 A1 | 4/2011 |

(Continued)

OTHER PUBLICATIONS

Translation of JP 2005087030 A (Year: 2005).*
(Continued)

*Primary Examiner* — David P Porta
*Assistant Examiner* — Mamadou Faye
(74) *Attorney, Agent, or Firm* — Faegre Drinker Biddle & Reath LLP

(57) ABSTRACT

A fluorescence observation device is a device for performing fluorescence observation of a sample piece cut out from a sample including: a tray on which the sample piece is placed; a light source unit which generates excitation light to irradiate the sample piece; a detection unit which detects fluorescence from the sample piece; and an image generation unit which generates a fluorescence image of the sample piece based on a detection signal from the detection unit and the tray includes a plurality of placement regions provided around a center region of the tray and also includes a marker portion indicating a cutting orientation of the sample piece with respect to the sample.

8 Claims, 10 Drawing Sheets

(58) Field of Classification Search
CPC ....... G01N 2021/0339; G01N 21/6428; G01N 21/645; G01N 21/6486
See application file for complete search history.

(56) References Cited

U.S. PATENT DOCUMENTS

| | | | | |
|---|---|---|---|---|
| 10,753,838 B2* | 8/2020 | James | ............... | G01N 33/42 |
| 2004/0239916 A1 | 12/2004 | Seino et al. | | |
| 2005/0186114 A1* | 8/2005 | Reinhardt | ............... | G01N 1/36 |
| | | | | 422/65 |
| 2007/0166834 A1 | 7/2007 | Williamson et al. | | |
| 2010/0167338 A1* | 7/2010 | Amano | ............... | G01N 1/36 |
| | | | | 435/40.52 |
| 2010/0292098 A1* | 11/2010 | Pawlak | ............... | G01N 21/648 |
| | | | | 506/13 |
| 2016/0147058 A1* | 5/2016 | Yamada | ............... | H04N 25/61 |
| | | | | 348/80 |
| 2016/0194590 A1* | 7/2016 | Loboda | ............... | H01J 49/0027 |
| | | | | 435/307.1 |
| 2017/0086301 A1* | 3/2017 | Minev | ............... | H05K 3/28 |
| 2018/0156713 A1* | 6/2018 | Berezhna | ............... | G01N 15/0227 |
| 2019/0060893 A1 | 2/2019 | Evans et al. | | |

FOREIGN PATENT DOCUMENTS

| | | | | |
|---|---|---|---|---|
| JP | 2005-087030 A | | 4/2005 | |
| JP | 2005087030 A | * | 4/2005 | ............ C12M 23/10 |
| JP | 2009-513958 A | | 4/2009 | |
| JP | 2011-188835 A | | 9/2011 | |
| JP | 2014-062888 A | | 4/2014 | |
| JP | 2014-182131 A | | 9/2014 | |
| JP | 2015-524918 A | | 8/2015 | |
| JP | 5991975 B2 | | 9/2016 | |
| KR | 10-2003-0045123 A | | 6/2003 | |
| WO | WO-2006/080239 A1 | | 8/2006 | |
| WO | WO-2007/048436 A1 | | 5/2007 | |
| WO | WO-2013/192607 A1 | | 12/2013 | |
| WO | WO 2014/159620 A1 | | 10/2014 | |
| WO | WO 2016/156516 A2 | | 10/2016 | |
| WO | WO-2017/082242 A1 | | 5/2017 | |

OTHER PUBLICATIONS

International Preliminary Report on Patentability dated Oct. 7, 2021 for PCT/JP2019/047041.
John W. Kakareka et al., "A Portable Fluorescence Camera for Testing Surgical Specimens in the Operating Room: Description and Early Evaluation", Molecular Imaging and Biology, Springer-Verlag, NE, vol. 13, No. 5, Oct. 20, 2010, p. 862-p. 867, XP019956291.

* cited by examiner (a)

(b)

(c)

(a)

(b)

FLUORESCENCE OBSERVATION DEVICE

TECHNICAL FIELD

The present disclosure relates to a fluorescence observation device.

BACKGROUND ART

As a conventional fluorescence observation device, for example, an identification device described in Patent Literature 1 is known. This conventional identification device is a device that spectroscopically detects the fluorescence of protoporphyrins existing at a tumor site of a subject. Protoporphyrins are protoporphyrin IX (PpIX) and photo-protoporphyrin (PPp). The identification device includes a light irradiation unit which converts a part of PpIX into PPp, a spectroscopic unit which disperses the fluorescence of PpIX and the fluorescence of PPp, a spectroscopic detection unit which detects a relative fluorescence intensity between the fluorescence of PpIX and the fluorescence of PPp, and a tumor discrimination unit which discriminates a tumor site and a normal site based on the relative fluorescence intensity between PpIX and PPp.

CITATION LIST

Patent Literature

Patent Literature 1: Japanese Patent No. 5991975

SUMMARY OF INVENTION

Technical Problem

When surgery is performed to excise a tumor, a postoperative stump examination is performed to see if a tumor tissue remains in a surgical site. A sample of the stump examination is a tissue excised by surgery and includes a tumor tissue and a normal tissue around the tumor tissue. In the stump examination, a surface portion of the sample is cut out into a plurality of sample pieces and the sample pieces are stained with a fluorescence probe. The tumor tissue and the normal tissue have a different temporal behavior in fluorescence intensity. For this reason, it is possible to determine whether or not a tumor tissue remains in the sample piece by measuring the fluorescence intensity of the sample piece after a predetermined time elapses from the staining with the fluorescence probe. When the tumor tissue does not remain in the sample piece, it is determined that the tumor tissue does not remain in the surgical site.

The determination on whether or not the tumor tissue remains by the stump examination is performed by, for example, a pathologist. However, since a pathologist observes a sample piece with a microscope after making a pathological sample at present, it is required to improve the observation speed and the observation accuracy. Further, when the tumor tissue remains in the sample piece, a method of easily identifying a positional relationship between the residual site of the tumor tissue in the sample and the surgical site of the patient is necessary in order to appropriately administer additional treatment to the patient.

The present disclosure has been made to solve the above-described problems and an object of the present disclosure is to provide a fluorescence observation device capable of improving observation speed and observation accuracy and easily identifying a positional relationship between a sample piece and a sample which is a cutout source.

Solution to Problem

A fluorescence observation device according to an aspect of the present disclosure is a fluorescence observation device for performing fluorescence observation of a sample piece cut out from a sample including: a tray on which the sample piece is placed; a light source unit which generates excitation light to irradiate the sample piece; a detection unit which detects fluorescence from the sample piece; and an image generation unit which generates a fluorescence image of the sample piece based on a detection signal from the detection unit, wherein the tray includes a plurality of placement regions provided around a center region of the tray and also includes a marker portion indicating a cutting orientation of the sample piece with respect to the sample.

In this fluorescence observation device, the fluorescence image is generated based on the fluorescence from the sample piece. By the observation of the fluorescence image, the observation speed and the observation accuracy are improved as compared with the case of observing the fluorescence of the sample piece with the microscope. Further, in this fluorescence observation device, the plurality of placement regions on which the sample pieces are placed are provided around the center region of the tray and the marker portion indicating the cutting orientation of the sample piece with respect to the sample is provided therein. By the arrangement of these placement regions and the marker portion, it is possible to easily identify a positional relationship between the sample piece cut out from the sample and the sample which is a cutout source.

The tray may include a reference portion which generates fluorescence of reference intensity by irradiation with the excitation light. By referring to the reference intensity of the fluorescence, it is possible to sufficiently ensure the observation accuracy even when the fluorescence intensity of the sample piece slightly varies over time.

The reference portion may be provided in the center region. In this case, it is possible to efficiently use the space of the tray.

The plurality of placement regions may be partitioned from each other by a partition member. In this case, it is possible to prevent the fluorescence probe applied to the sample piece from flowing to the other placement region. Further, it is possible to prevent the sample piece of the other placement region from being irradiated with the fluorescence generated from the sample piece.

The placement region may be provided with a fixing portion which fixes the sample piece. In this case, it is possible to prevent the misalignment, inversion, and the like of the sample piece during fluorescence observation using the fixing portion.

The fluorescence observation device may further include a dish which is disposed on the placement region and the dish may be provided with a fixing portion which fixes the sample piece. It is easy to handle the sample piece by using the dish. Further, it is possible to prevent the misalignment, inversion, and the like of the sample piece during fluorescence observation using the fixing portion.

The image generation unit may have a brightness distribution for detecting the fluorescence in the detection unit and perform shading correction of the fluorescence image based on the brightness distribution. In this case, it is possible to observe the sample piece based on a clearer fluorescence image.

The image generation unit may generate a result image in which a fluorescence observation result of the sample piece is associated with the placement region. Accordingly, it is possible to visually recognize the observation result and further improve the observation speed.

Advantageous Effects of Invention

According to the present disclosure, it is possible to improve observation speed and observation accuracy and easily identify a positional relationship between a sample piece and a sample which is a cutout source.

DESCRIPTION OF EMBODIMENTS

Hereinafter, a preferred embodiment of a fluorescence observation device according to an aspect of the present disclosure will be described in detail with reference to the drawings.

Figure 1:
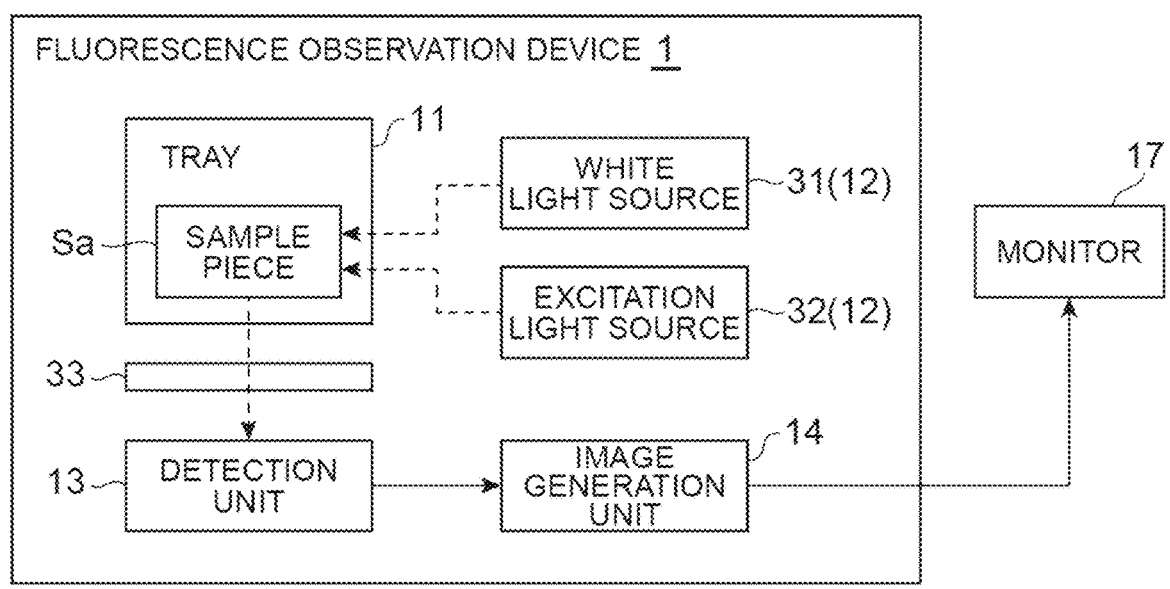
FIG. 1 is a block diagram showing an embodiment of a fluorescence observation device.
Figure 3:
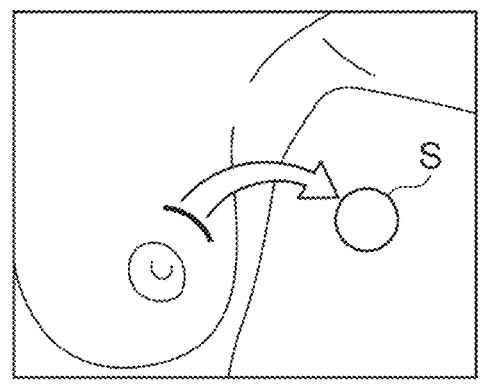
FIG. 3 is a schematic view showing a preparation of a sample and a sample piece.
Figure 3:
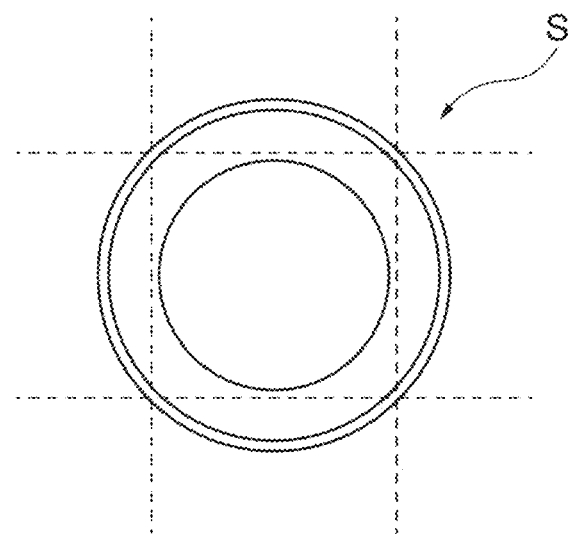
Figure 3:
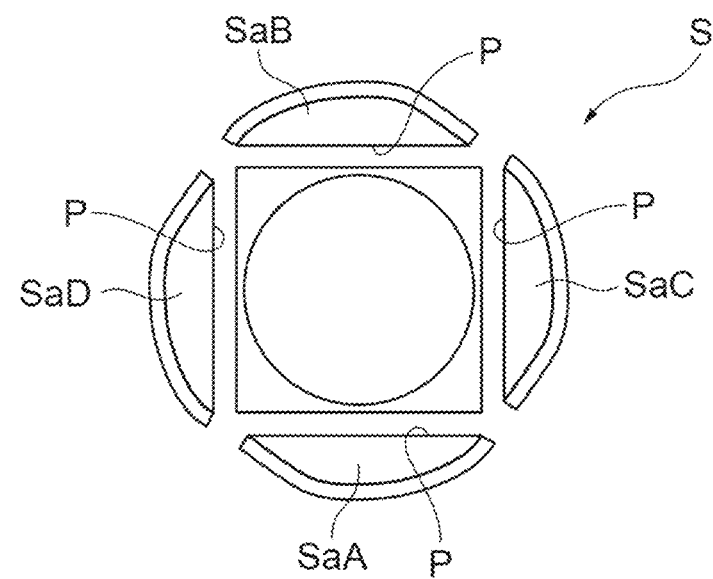

FIG. 1 is a block diagram showing an embodiment of a fluorescence observation device. A fluorescence observation device 1 is configured as a device that performs fluorescence observation of a sample piece Sa cut out from a sample S (see FIG. 3). In this embodiment, as an application example of the fluorescence observation device 1, a stump examination of a tumor tissue excised from a patient by surgery will be illustrated. In the stump examination, a surface portion of the sample S is cut out into a plurality of the sample pieces Sa and the sample pieces Sa are stained with a fluorescence probe. A tumor tissue and a normal tissue have a different temporal behavior in fluorescence intensity. For this reason, it is possible to determine whether or not a tumor tissue remains in the sample piece Sa by measuring the fluorescence intensity of the sample piece Sa after a predetermined time elapses from the staining with the fluorescence probe.

The fluorescence probe is a substance that changes its molecular structure by reacting with a specific substance and generates strong fluorescence. As the fluorescence probe used in the stump examination, for example gGlu-HMRG can be exemplified. gGlu-HMRG is a liquid fluorescence substance. Before the reaction, gGlu-HMRG is colorless and transparent and exhibits water solubility. gGlu-HMRG that has reacted with an enzyme derived from a tumor tissue becomes colored and visualized. Further, gGlu-HMRG changes from water-soluble to hydrophobic and exhibits the property of penetrating a cell membrane and staying inside a cell. Thus, it is possible to highly accurately detect a minute tumor tissue of, for example, about several mm by using gGlu-HMRG.

The fluorescence observation device 1 includes, as shown in FIG. 1, a tray 11, a light source unit 12, a detection unit 13, and an image generation unit 14. These configurations are disposed in a housing 16 (see FIG. 2) that shields light from the outside. Further, the fluorescence observation device 1 is connected to a monitor 17 in a wired or wireless manner for information communication. The monitor 17 can be configured as a personal computer and a smart device (smartphone, tablet terminal).

Figure 2:
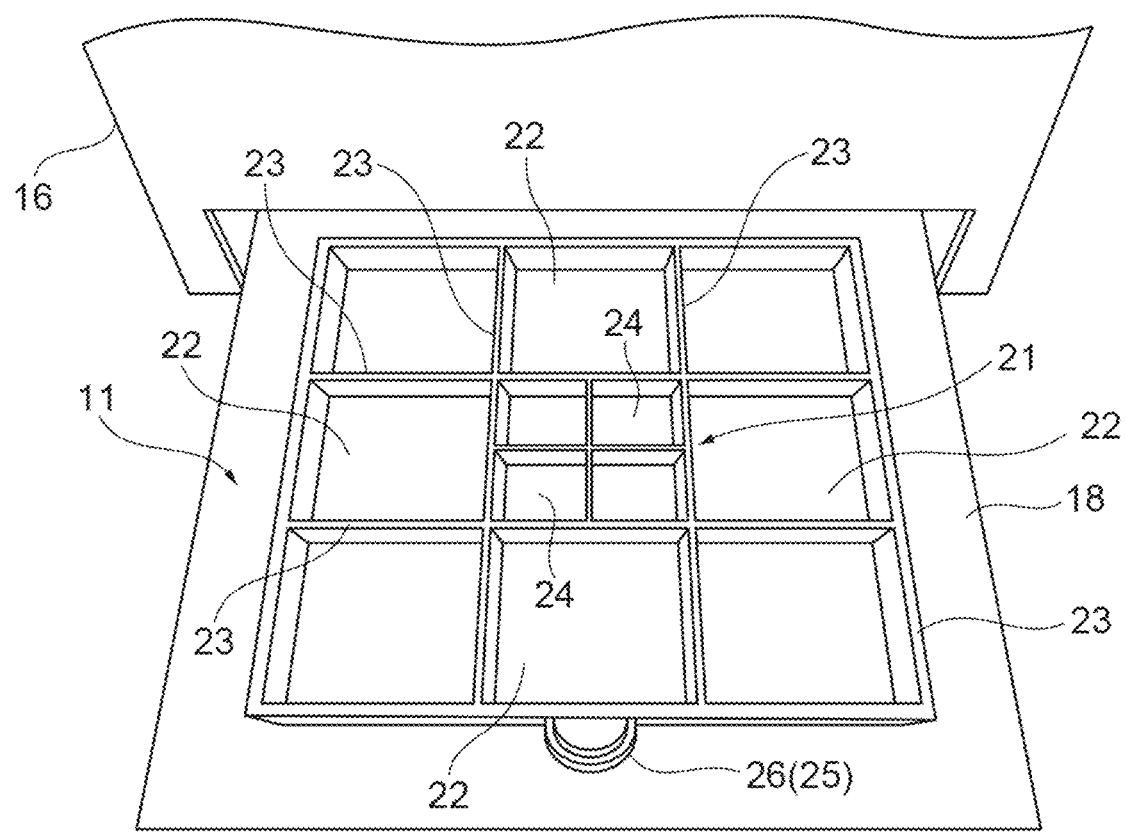
FIG. 2 is a perspective view showing an example of a tray applied to the fluorescence observation device.

The tray 11 is a portion that places the sample piece Sa thereon. As shown in FIG. 2, the tray 11 is formed of, for example, a resin in a substantially square plate shape in a plan view. The tray 11 preferably has a dark color such as black in order to ensure the sensitivity of fluorescence observation of the sample piece Sa. For example, the tray 11 can be placed on a top surface of a drawer portion 18 provided at the lower portion of one side surface of the housing 16. By moving the drawer portion 18 in and out, the sample piece Sa placed on the tray 11 can be advanced and retracted with respect to the inspection position in the housing 16.

As shown in FIG. 2, one surface side of the tray 11 is provided with a center region 21 and a plurality of placement regions 22 provided around the center region 21. In this embodiment, the center region 21 and the placement regions 22 are arranged in a matrix. In this embodiment, the placement region 22 is disposed at eight positions around the center region 21 and eight sample pieces Sa can be observed simultaneously to maximum. The center region 21 and the placement region 22 both have a square shape and have equal areas with each other.

Further, the center region 21 and the placement region 22 are partitioned from each other by a partition member 23. The partition member 23 is formed of resin integrally with the main body of the tray 11. The partition member 23 is provided to surround the center region 21 and the placement region 22 with a predetermined prevention height in order to prevent the fluorescence probe applied to the sample piece Sa from flowing to the other placement region 22 and prevent the sample piece Sa of the other placement region 22 from being irradiated with the fluorescence generated from the sample piece Sa.

Figure 4:
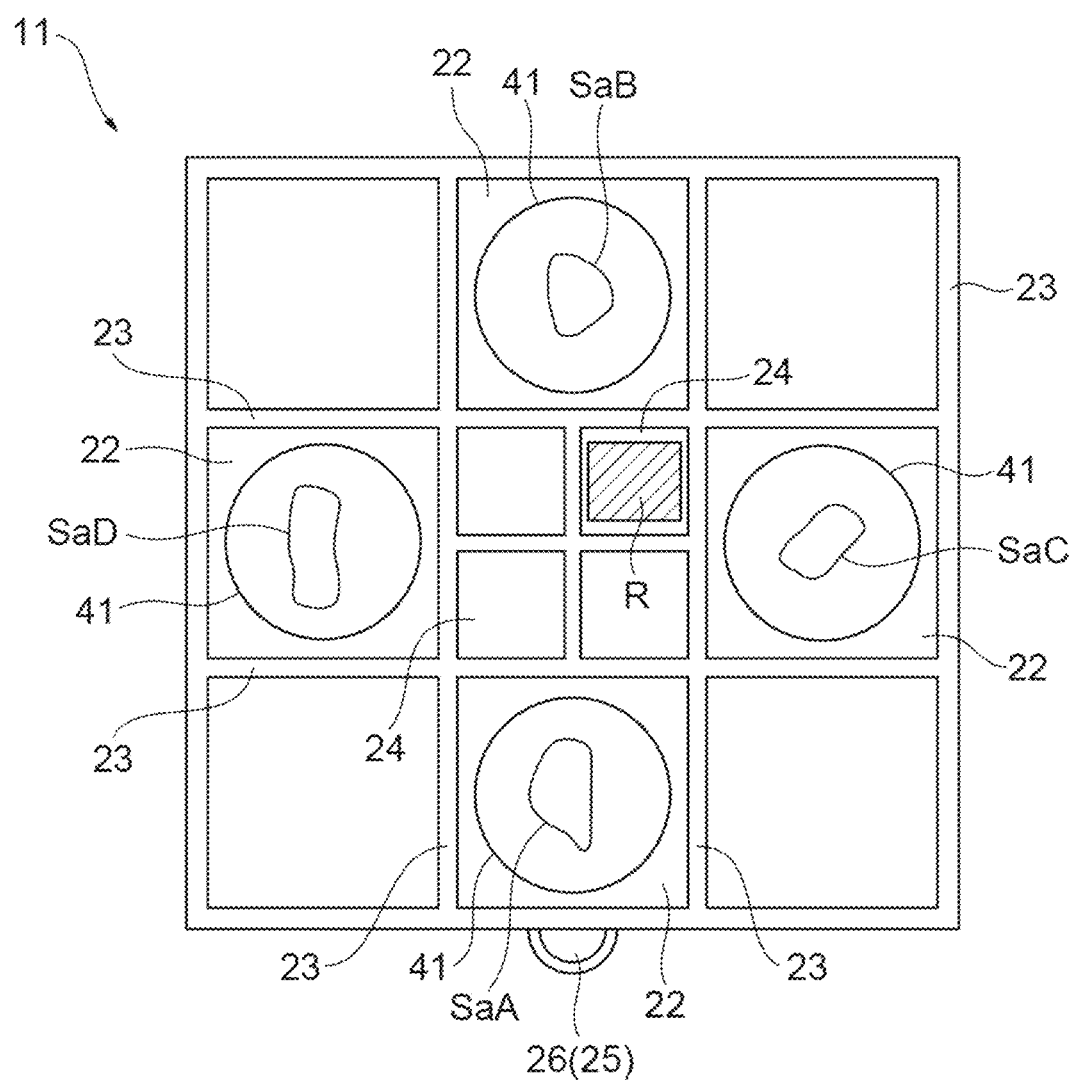
FIG. 4 is a plan view showing a placement example of the sample piece on the tray.

In this embodiment, the center region 21 is further divided into four divided regions 24 in a matrix. The divided region 24 is a region in which a reference plate (reference portion) R to be described later in FIG. 4 is disposed. The reference plate R is a plate-shaped member that generates fluorescence of reference intensity by irradiation of the excitation light. The fluorescence intensity of the reference plate R does not vary over time unlike the fluorescence intensity of the tumor tissue. For this reason, it is possible to perform highly accurate fluorescence observation even when the fluorescence intensity of the sample piece Sa slightly varies over time by referring to the fluorescence intensity of the reference plate R. In this embodiment, the reference plate R is exemplified as the reference portion, but the shape of the reference portion is not particularly limited and may be other shapes such as a columnar shape and a block shape.

The tray 11 includes a marker portion 25 which indicates a cutting orientation of the sample piece Sa with respect to the sample S. For example, when the center region 21 is regarded as the center portion of the sample S, the marker portion 25 indicates an orientation of the sample piece Sa placed on each placement region 22 with respect to the sample S which is a cutout source. In this embodiment, the marker portion 25 is configured as a protrusion portion 26 which protrudes laterally from one edge of the tray 11. The association between the protrusion portion 26 and the cutting orientation is arbitrary. For example, when the orientation indicated by the position of the protrusion portion 26 is "down", the cutting orientation of the edge provided with the protrusion portion 26 is "down" and the cutting orientation of the edge opposite to the protrusion portion 26 with the center region 21 therebetween is "up". Further, for example, the cutting orientation of the edge on the right side of the paper surface in FIG. 2 is "right" and the cutting orientation of the edge on the left side of the paper surface in FIG. 2 is "left".

In the example of FIG. 2, the planar shape of the protrusion portion 26 is a semicircular shape, but the planar shape of the protrusion portion 26 is arbitrary and may be a rectangular shape, a polygonal shape, or the like. The marker portion 25 is not limited to the protrusion portion 26 and other embodiments may be taken. For example the marker portion 25 may be formed by characters, symbols, colors, figures, a combination thereof, and the like in addition to the protrusion portion 26.

As shown in FIG. 1, the light source unit 12 includes a white light source 31 and an excitation light source 32. For example, the white light source 31 and the excitation light source 32 are disposed above the arrangement position of the tray 11 in the housing 16. The white light source 31 is configured as, for example, a lamp or the like and irradiates the sample piece Sa on the tray 11 with white light from above. Further, the excitation light source 32 is configured as, for example, an LED or the like and irradiates the sample piece Sa on the tray 11 with the excitation light from above.

The detection unit 13 includes, for example, an imaging element such as a CCD image sensor or a CMOS image sensor. For example, the detection unit 13 is disposed above the arrangement position of the tray 11 in the housing 16. A detection surface (not shown) of the detection unit 13 is disposed downward to face the tray 11. If necessary, the detection unit 13 may include an optical filter 33 which transmits fluorescence of a wavelength generated by the sample piece Sa. The detection unit 13 outputs a detection signal indicating an imaging result of the sample piece Sa by white light and a detection signal indicating an imaging result of fluorescence generated in the sample piece Sa by the irradiation of the excitation light to the image generation unit 14.

The image generation unit 14 is configured as, for example, a microcomputer including a processor and a memory, a field-programmable gate array (FPGA), or the like. The image generation unit 14 generates a fluorescence image of the sample piece Sa based on the detection signal from the detection unit 13. In this embodiment, the image generation unit 14 generates a visible image based on a detection signal indicating an imaging result of the sample piece Sa by white light and generates a fluorescence image based on a detection signal indicating an imaging result of the fluorescence generated in the sample piece Sa. Then, the image generation unit 14 generates a superimposed imaged in which the visible image and the fluorescence image are superimposed and outputs the superimposed image to the monitor 17. Further, the image generation unit 14 generates a result image (see FIG. 6) G in which the fluorescence observation result of the sample piece Sa and the placement region 22 are associated with each other and outputs the result image to the monitor 17.

The image generation unit 14 may have a function of performing shading correction of the fluorescence image (superimposed image). In this case, the image generation unit 14 holds in advance a brightness distribution for detecting the fluorescence in the detection unit 13 based on, for example, the imaging result of the reference plate having the same area as that of the tray 11 and performs shading correction of the fluorescence image (superimposed image) based on the brightness distribution. By performing shading correction, it is possible to cancel the influence of the fluorescence brightness distribution caused by the configuration of the detection unit 13 and improve the accuracy of the fluorescence observation.

Next, a fluorescence observation method using the above-described fluorescence observation device 1 will be described. Here, the above-described stump examination will be illustrated. In the stump examination, first, as shown in FIG. 3(a), a tumor tissue is excised from the patient by surgery and this is used as the sample S. Next, as shown in FIG. 3(b), a surface portion of the sample S is cut out with a knife or the like to prepare a plurality of sample pieces SaA to SaD as shown in FIG. 3(c). In the sample pieces SaA to SaD, a cutting orientation of the sample S to the up, down, right, and left sides is determined in relation to a human body from which a sample is excised. In the example of FIG. 3(c), the orientation of the sample piece SaA is "down", the orientation of the sample piece SaB is "up", the orientation of the sample piece SaC is "right", and the orientation of the sample piece SaD is "left".

After preparing the sample piece Sa, as shown in FIG. 4, the sample piece Sa is set in the tray 11. In the example of FIG. 4, each sample piece Sa is disposed in a dish 41 of a bottomed cylinder and the sample piece Sa is disposed on the placement region 22 with the dish 41 therebetween. Regarding the arrangement of the sample piece Sa in the placement region 22, the sample pieces SaA to SaD are arranged to correspond to the cutting orientation indicated by the marker portion 25 of the tray 11. That is, the sample piece SaA is placed on the placement region 22 at the center on the edge side provided with the protrusion portion 26 and the sample piece SaB is placed on the placement region 22 at the center on the edge side opposite to the protrusion portion 26 with the center region 21 therebetween. Further, the sample piece SaC is placed on the placement region 22 at the center on the right edge side of the paper surface in FIG. 4 and the sample piece SaD is placed on the placement region 22 at the center on the left edge side of the paper surface in FIG. 4.

Further, regarding the arrangement of the sample piece Sa in the placement region 22, a cutout surface P (see FIG. 3(c)) is directed upward (the side of the detection unit 13). The outermost surface portion of the sample S (see FIGS. 3(b) and 3(c)) may have degenerated tissue due to the influence of an electric knife used in the surgery and almost no reaction to the fluorescence probe occurs. For this reason, the cutout surface P of the sample piece Sa becomes the stump of the observation target. The reference plate R is disposed on the center region 21. The arrangement position of the reference plate R in the divided region 24 is arbitrary. That is, the reference plate R may be disposed in any one of four divided regions 24.

After the sample piece Sa is set in the tray 11, each sample piece Sa is stained with the fluorescence probe and the tray 11 is placed on the top surface of the drawer portion 18. Next, the drawer portion 18 is accommodated in the housing 16 and is advanced to an inspection position in the housing 16 of the sample piece Sa placed on the tray 11. Subsequently, the sample piece Sa is irradiated with white light and excitation light from the light source unit 12 and fluorescence generated in the sample piece Sa by the irradiation of the excitation light is detected. Then, a superimposed image is generated by superimposing a visible image generated based on a detection signal indicating an imaging result of the sample piece Sa due to the white light and a fluorescence image generated based on a detection signal indicating an fluorescence imaging result generated in the sample piece Sa and the superimposed image is output to the monitor 17. Further, a result image in which a fluorescence observation result of the sample piece Sa is associated with the placement region 22 is output to the monitor 17. Additionally, the autofluorescence of the sample piece Sa may be detected before staining with the fluorescence probe and the autofluorescence intensity may be corrected to detect the fluorescence intensity.

Figure 5:
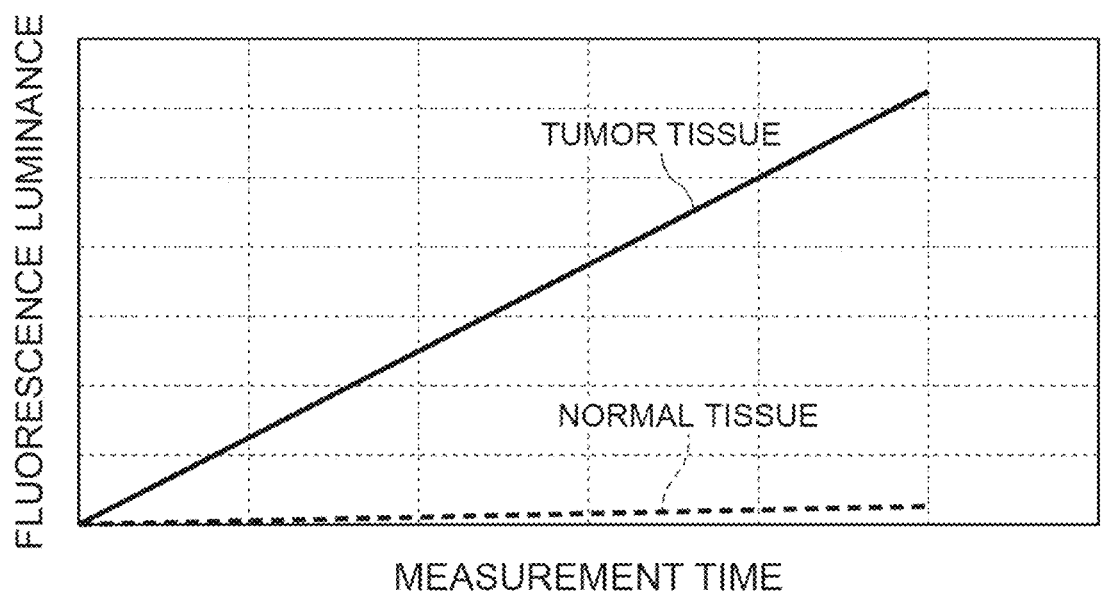
FIG. 5 is a graph showing a detection example of a temporal behavior of fluorescence intensity in a tumor tissue and a normal tissue.

FIG. 5 is a graph showing a detection example of a temporal behavior of the fluorescence intensity in the tumor tissue and the normal tissue. In FIG. 5, a horizontal axis indicates the time (the elapse time after staining with the fluorescence probe) and a vertical axis indicates the fluorescence intensity. As shown in FIG. 5, there is almost no variation in fluorescence intensity over time in the normal tissue and the fluorescence intensity tends to gradually increase over time in the tumor tissue. Thus, it is possible to determine whether or not the sample piece Sa contains the tumor tissue by comparing the fluorescence intensity after a predetermined time elapses with a predetermined threshold value.

Figure 6:
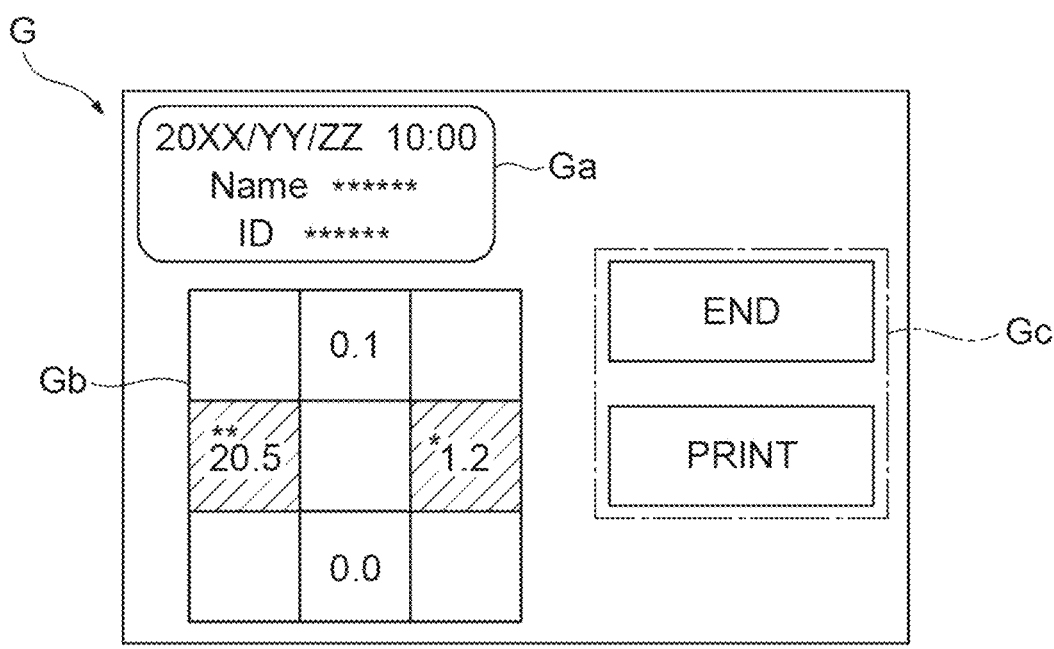
FIG. 6 is a diagram showing a display example of a result image.

FIG. 6 is a diagram showing a display example of a result image. In the example of the same drawing, the result image G includes, for example, a region Ga in which a stump examination ID and the like are displayed, a region Gb in which a figure corresponding to the placement region 22 of the tray 11 is displayed, and a region Gc in which a command for the result image G is displayed. In the region Ga, for example, the date and time of the inspection, the name of the person to be inspected, the ID, and the like are displayed. In the region Gb, the fluorescence observation result of the sample piece Sa and the placement region 22 are displayed in association with each other. Here, color coding based on whether the observation result is positive or negative, a mark indicating the degree of positive, and the like are displayed in addition to the numerical value indicating the fluorescence intensity. In the region Gc, a command to close the result image G, a print command, and the like are displayed.

When the sample pieces Sa contain a positive determination result, the sample piece Sa which is determined to be positive is selected and submitted to a pathologist in association with the cutting orientation. Accordingly, it is possible to screen only the sample piece Sa which is determined to be positive from the plurality of sample pieces Sa and easily identify a positional relationship between the sample piece Sa which is determined to be positive and the sample S (that is, a surgical site of a patient) which is a cutout source.

As described above, in the fluorescence observation device 1, the fluorescence image is generated based on the fluorescence from the sample piece Sa. By the observation of the fluorescence image, it is possible to improve the observation speed and the observation accuracy as compared with a case in which the fluorescence of the sample piece Sa is observed with a microscope. Further, in the fluorescence observation device 1, the plurality of placement regions 22 on which the sample pieces Sa are placed are provided around the center region 21 of the tray 11 and the marker portion 25 indicating the cutting orientation of the sample piece Sa with respect to the sample S is provided therein. By the arrangement of the placement regions 22 and the marker portion 25, it is possible to easily identify a positional relationship between the sample piece Sa which is cut out from the sample S and the sample S which is a cutout source.

In this embodiment, the tray 11 includes the reference plate R which generates fluorescence having reference intensity by irradiation of the excitation light. By referring to the reference intensity of the fluorescence, it is possible to sufficiently ensure the observation accuracy even when the fluorescence intensity of the sample piece Sa slightly varies over time. Further, in this embodiment, the reference plate R is provided in the center region 21. Accordingly, it is possible to efficiently use the space of the tray 11.

In this embodiment, the plurality of placement regions 22 of the tray are partitioned from each other by the partition member 23. Accordingly, it is possible to prevent the fluorescence probe applied to the sample piece Sa from flowing to the other placement region 22. Further, it is possible to prevent the sample piece Sa of the other placement region 22 from being irradiated with the fluorescence generated from the sample piece Sa.

In this embodiment, the image generation unit 14 has a brightness distribution for detecting the fluorescence in the detection unit 13 and performs shading correction of the fluorescence image based on the brightness distribution. Accordingly, it is possible to observe the sample piece Sa based on the clear fluorescence image. Further, in this embodiment, the image generation unit 14 generates the result image G in which the fluorescence observation result of the sample piece Sa is associated with the placement region 22. Accordingly, it is possible to visually recognize the observation result and further improve the observation speed.

Figure 7:
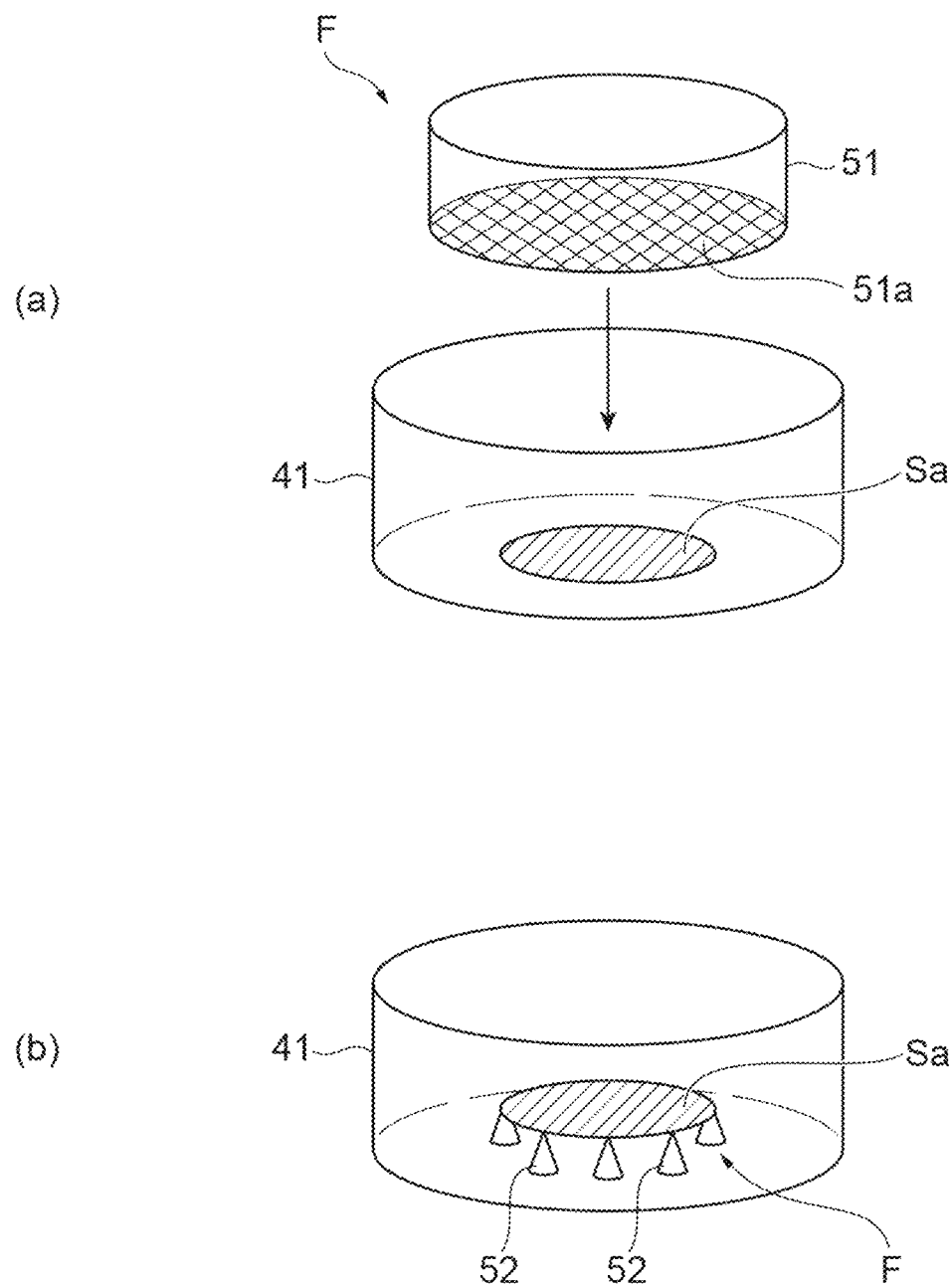
FIG. 7 is a schematic perspective view showing an example of a fixing portion for fixing the sample piece.

The present disclosure can be modified into various forms. For example, in the above-described embodiment, the sample piece Sa is placed on the dish 41, but a fixing portion F for fixing the sample piece Sa to the dish 41 may be provided. In the example of FIG. 7(a), the fixing portion F is configured as a dish 51 provided with a bottom surface 51a having a mesh shape. This dish 51 has an outer diameter that is one size smaller than the inner diameter of the dish 41 on which the sample piece Sa is placed. In this case, it is possible to fix the sample piece Sa to the dish 41 by pressing the bottom surface 51a having a mesh shape against the sample piece Sa in the dish 41.

In the example of FIG. 7(b), the fixing portion F is configured as a plurality of fine needles 52 provided on the bottom surface of the dish 41. In this case, it is possible to fix the sample piece Sa to the dish 41 by inserting the sample piece Sa into the needle 52. It is easy to handle the sample piece Sa by providing the fixing portion F in the dish 41. Although a case is supposed in which the attitude of the sample piece Sa is changed due to the buoyancy received from the fluorescence probe during the fluorescence observation, it is possible to prevent the misalignment, inversion, and the like of the sample piece Sa during the fluorescence observation by using the fixing portion F.

Figure 8:
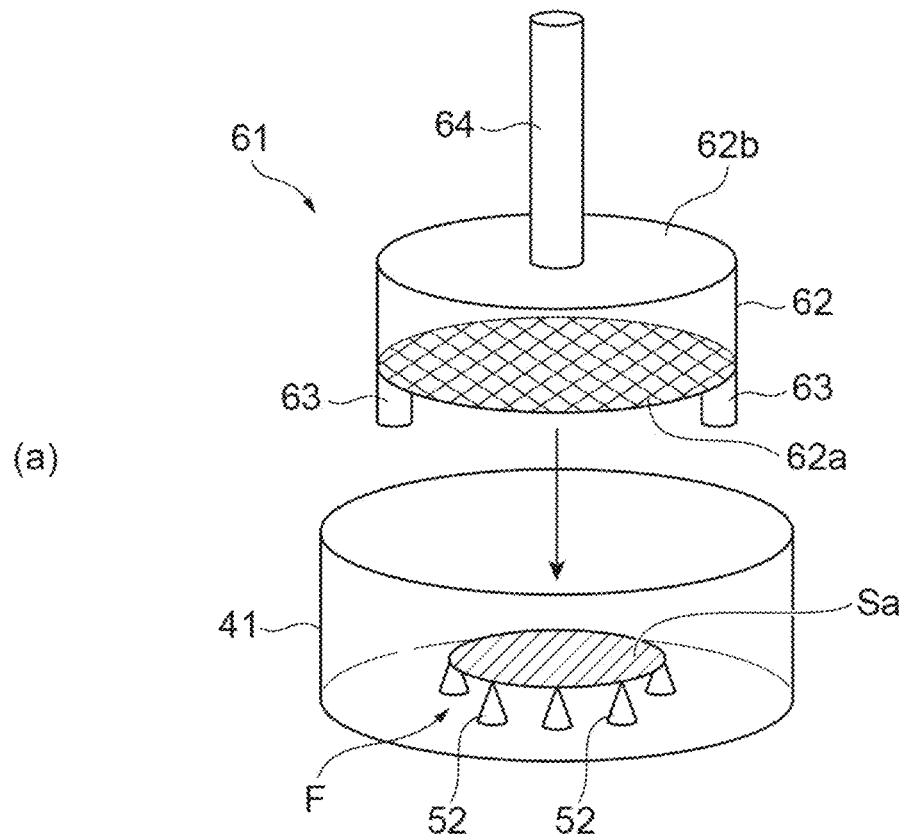
FIG. 8 is a perspective view showing an example of a stamp jig used in combination with the fixing portion.
Figure 8:
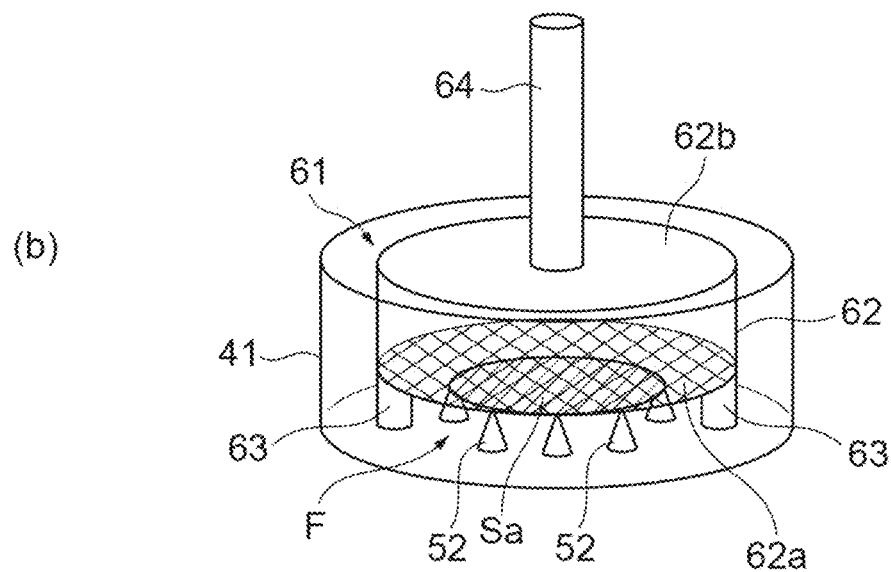

Further, a stamp jig 61 shown in FIGS. 8(a) and 8(b) may be used together with the fixing portion F. For example, the stamp jig 61 includes a tubular portion 62 which includes a bottom surface 62a having a mesh shape, a leg portion 63 which is provided in the edge of the bottom surface 62a, and a rod-shaped grip portion 64 which is provided at the center of a top surface 62b of the tubular portion 62. When the mesh-shaped bottom surface 62a is pressed against the sample piece Sa using the stamp jig 61, it is possible to define a force of pressing the sample piece Sa based on the length of the leg portion 63. Thus, it is possible to prevent the damage of the sample piece Sa due to the addition of an excessive pressing force.

In the above-described embodiment, the sample piece Sa is placed on the placement region 22 of the tray 11 through the dish 41, but the sample piece Sa may be directly placed on the tray 11 without using the dish 41. When the fixing portion F is used in this configuration, the above-described needle 52 may be directly provided on the surface of the tray 11.

Figure 9:
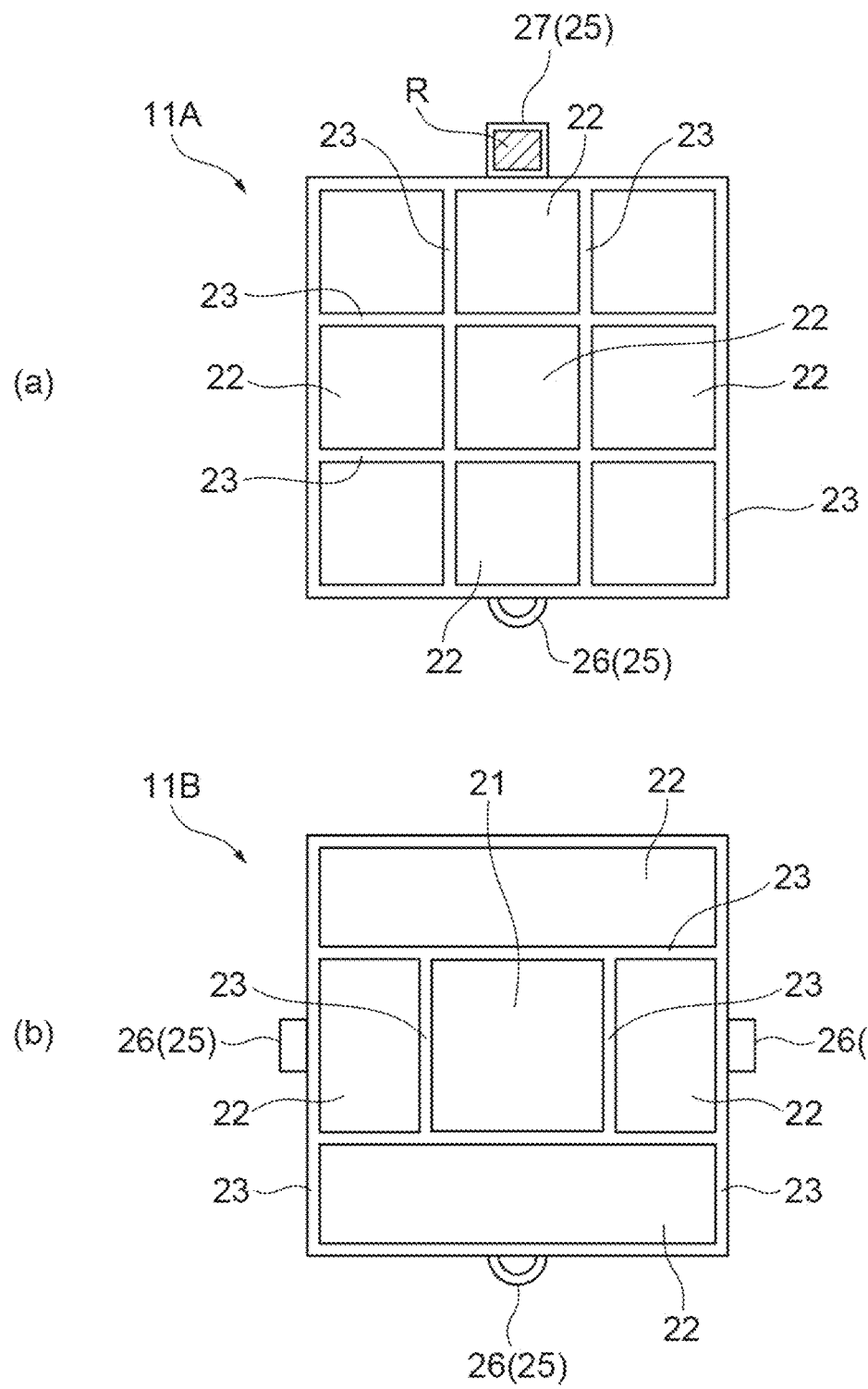
FIG. 9 is a plan view showing a modified example of the tray.
Figure 10:
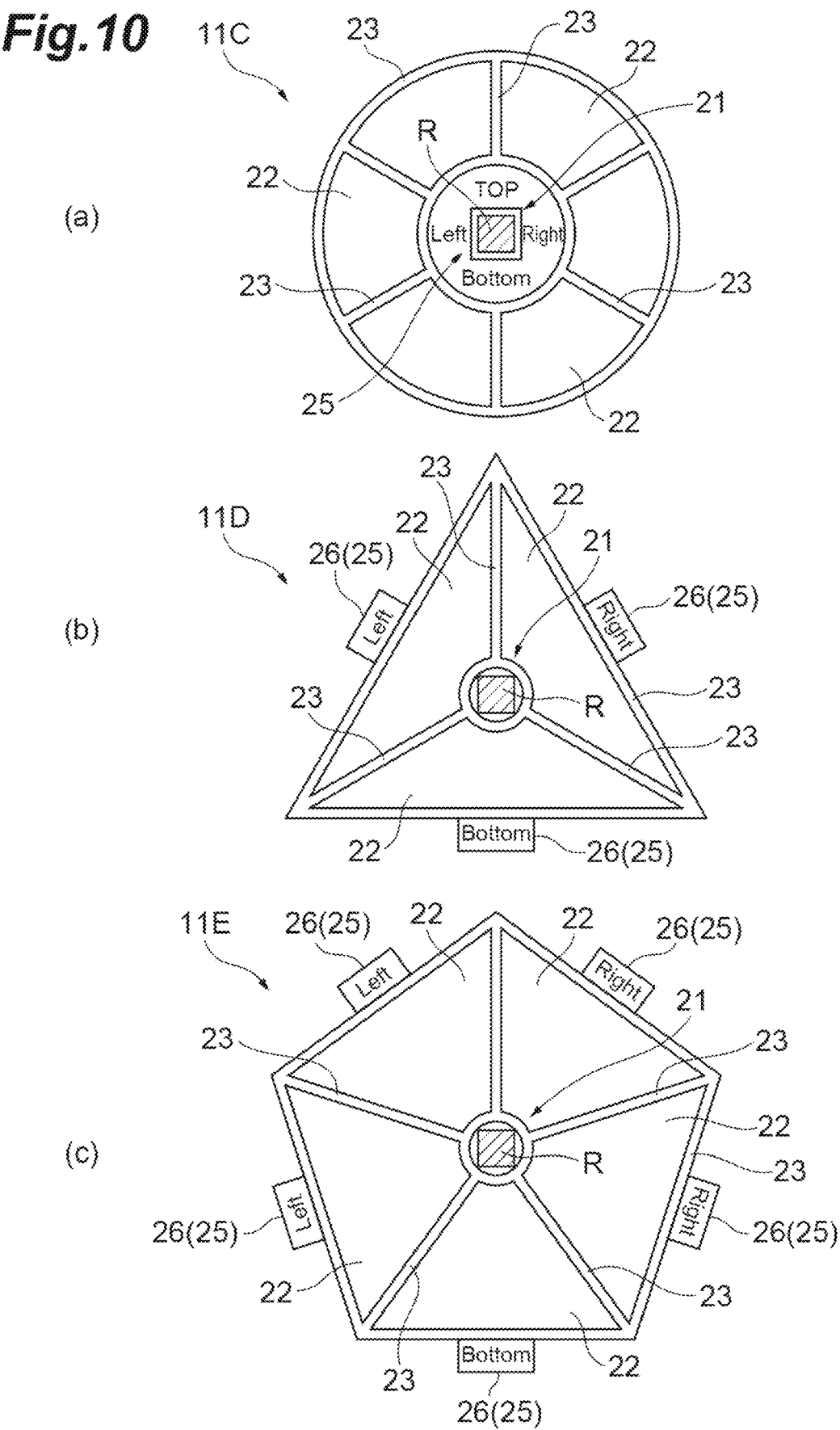
FIG. 10 is a plan view showing another modified example of the tray.

FIGS. 9 and 10 are plan views showing modified examples of the tray. In a tray 11A shown in FIG. 9(a), the placement regions 22 are provided in a matrix as in FIG. 1 and the center region 21 is also the placement region 22 for the sample piece Sa. In the tray 11A, an overhanging portion 27 for placing the reference plate R is provided in the edge on the side opposite to the protrusion portion 26 which is the marker portion 25. This overhanging portion 27 also functions as the marker portion 25. In a tray 11B shown in FIG. 9(b), four rectangular placement regions 22 are provided around the center region 21. In the tray 11B, the protrusion portion 26 which is the marker portion 25 is also provided in the right and left edges of the paper surface and the cutting orientation of the sample piece Sa can be more easily recognized. The planar shape of a tray 11C shown in FIG. 10(a) is a circular shape. In the tray 11C, the center region 21 has a circular shape and six arc-shaped placement regions 22 are arranged around the center region 21. The reference plate R is disposed in the center region 21. Further, in the center region 21, characters such as "TOP", "Bottom", "Left", and "Right" are attached as the marker portion 25 around the arrangement region of the reference plate R. The planar shape of a tray 11D shown in FIG. 10(b) is an equilateral triangle. In the tray 11D, the shape of the center region 21 is circular and three isosceles triangle-shaped placement regions 22 are arranged around the center region 21. The reference plate R is disposed in the center region 21. The protrusion portions 26 are provided in the edges corresponding to the sides of the tray 11D. Characters such as "Bottom", "Left", and "Right" are attached as the marker portion 25 in the protrusion portion 26. The planar shape of a tray 11E shown in FIG. 10(c) is a regular pentagonal shape. In the tray 11E, the shape of the center region 21 is circular and five equilateral triangular placement regions 22 are arranged around the center region 21. The reference plate R is disposed in the center region 21. The protrusion portions 26 are provided in the edges corresponding to the sides of the tray 11E. In the protrusion portion 26, characters such as "Bottom", "Left", and "Right" are attached as the marker portion 25.

Also in the trays 11A to 11E according to these modified examples, it is possible to easily identify a positional relationship between the sample piece Sa which is cut out from the sample S and the sample S which is a cutout source by the arrangement of the placement region 22 and the marker portion 25. Further, it is easy to handle the sample piece Sa when performing fluorescence observation by providing the placement regions 22 as many as the cut-out sample pieces Sa.

REFERENCE SIGNS LIST

1: fluorescence observation device, 11, 11A to 11E: tray, 12: light source unit, 13: detection unit, 14: image generation unit, 21: center region, 22: placement region, 23: partition member, 25: marker portion, 41: dish, F: fixing portion, G: result image, R: reference plate (reference portion), S: sample, Sa: sample piece.

The invention claimed is:

1. A fluorescence observation device for performing fluorescence observation of a sample piece cut out from a sample comprising:
   a tray configured to receive the sample piece;
   a light source configured to generate excitation light to irradiate the sample piece;
   a detector configured to detect fluorescence from the sample piece; and
   an image generator configured to generate a fluorescence image of the sample piece based on a detection signal from the detector,
   wherein the tray includes a plurality of placement regions provided around a center region of the tray and also includes a marker portion corresponding to a cutting orientation of the sample piece with respect to the sample and associating an orientation of the placement region with the cutting orientation of the sample piece and the center region.

2. The fluorescence observation device according to claim 1,
   wherein the tray includes a reference portion configured to generate fluorescence of reference intensity by irradiation with the excitation light.

3. The fluorescence observation device according to claim 2,
   wherein the reference portion is provided in the center region.

4. The fluorescence observation device according to claim 1,
   wherein the plurality of placement regions are partitioned from each other by a partition member.

5. The fluorescence observation device according to claim 1,
   wherein the placement region is provided with a fixing portion configured to fix the sample piece.

6. The fluorescence observation device according to claim 1, further comprising:
   a dish configured to be disposed on the placement region, wherein the dish is provided with a fixing portion configured to fix the sample piece.

7. The fluorescence observation device according to claim 1,
   wherein the image generator has a brightness distribution for detecting the fluorescence in the detector and performs shading correction of the fluorescence image based on the brightness distribution.

8. The fluorescence observation device according to claim 1,
   wherein the image generator generates a result image in which a fluorescence observation result of the sample piece is associated with the placement region.

* * * * *